Feb. 24, 1931.  G. C. CASE  1,793,678
METHOD OF CANNING TONGUES AND CANNED PRODUCT
Filed Sept. 30, 1926  2 Sheets-Sheet 1
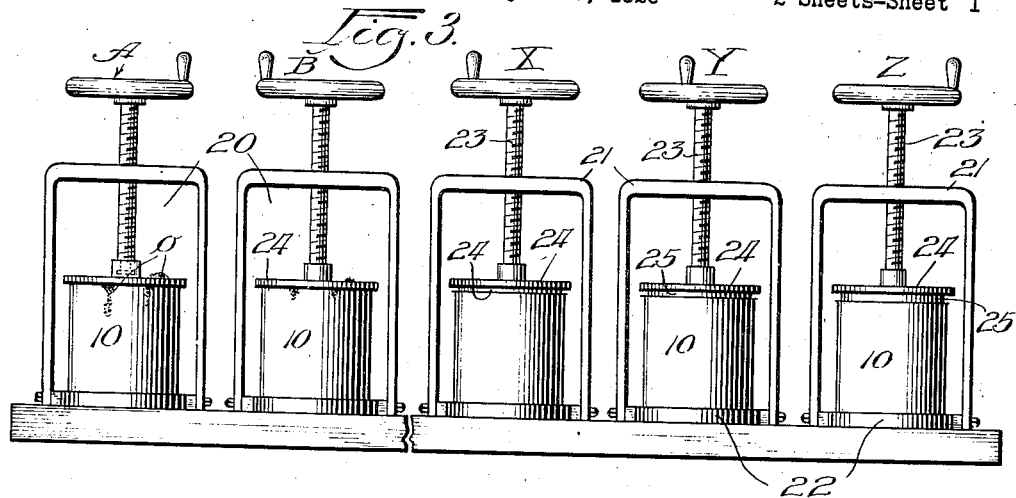
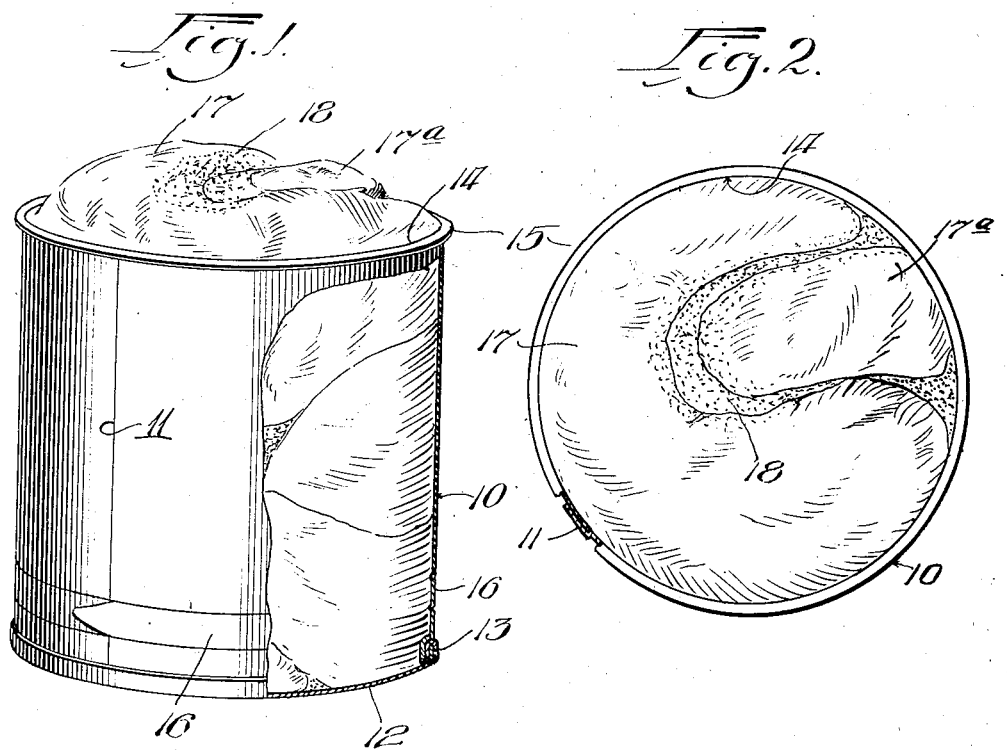
Inventor:
George C. Case Feb. 24, 1931.                G. C. CASE                1,793,678
              METHOD OF CANNING TONGUES AND CANNED PRODUCT
                      Filed Sept. 30, 1926         2 Sheets-Sheet 2
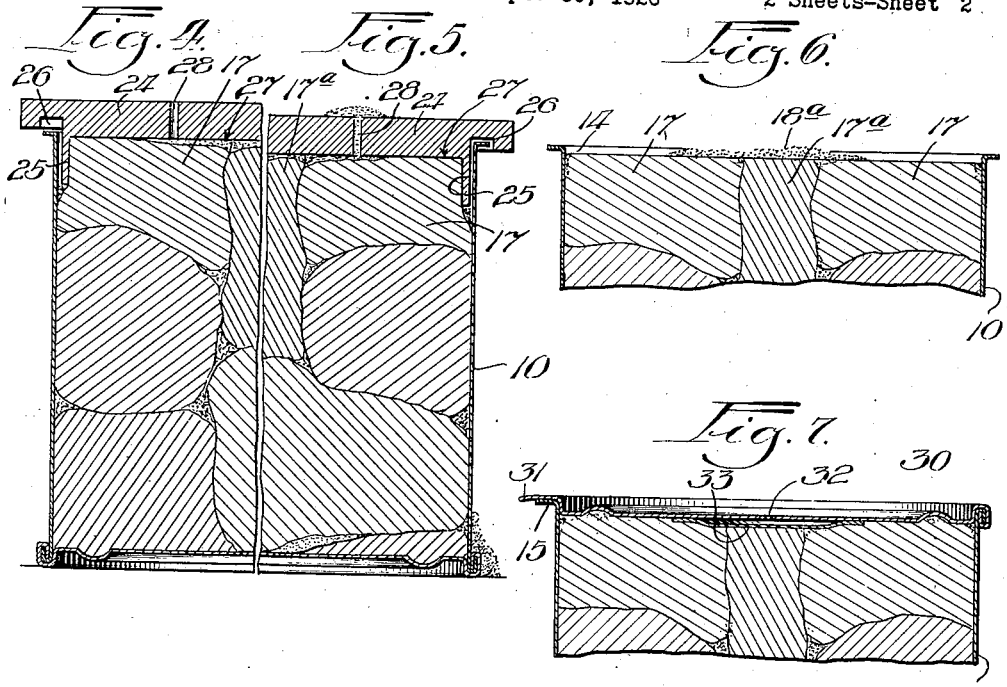
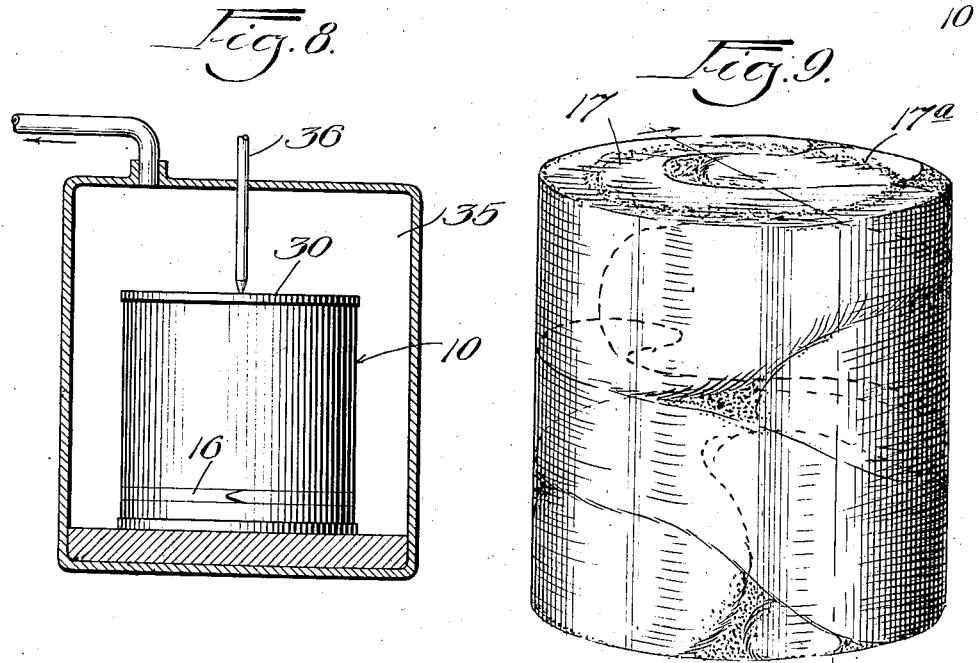
Inventor:
George C. Case Patented Feb. 24, 1931

1,793,678

UNITED STATES PATENT OFFICE

GEORGE C. CASE, OF CHICAGO, ILLINOIS, ASSIGNOR TO E. K. POND COMPANY, OF CHICAGO, ILLINOIS, A CORPORATION OF ILLINOIS

METHOD OF CANNING TONGUES AND CANNED PRODUCT

Application filed September 30, 1926. Serial No. 138,709.

My invention relates to the art of canning animal tongues, as of beeves, etc., for preservation indefinitely in edible condition. Its general objects are to improve over prior art by producing a bettered, more uniform and higher-price-commanding product and doing so at less initial cost, with less ultimate spoilage and waste-losses to both the producer and the consumer, and with less demand for special skill and manual effort of the packing-operator.

To these generally-stated ends, and others of more specific nature that will hereinafter become apparent, my invention consists in the features hereinafter set forth and claimed.

In the specification reference will be made to the accompanying drawings wherein:

Fig. 1 is a perspective view, with parts broken away, showing a container packed ready for compression; Fig. 2 is a plan view, partly broken away, of Fig. 1; Fig. 3 is a side elevation of a battery of compression-devices in different stages of compressive action; Figs. 4 and 5 are complemental fragmentary cross-sections of a loaded container under different stages of compression; Fig. 6 is a cross-section of a packed container ready for heading; Fig. 7 is a similar section of the container being headed; Fig. 8 is a diagram conventionally showing the exhaustion and vent-soldering of the container; and Fig. 9 is a perspective view of the pack, or contents, after de-canning.

The canning of large meat-tongues—beef-tongues being a staple article that I will refer to illustratively throughout the specification—has been an important industry of the great packing-houses for a long time past. The packages are principally for export. Trade demands and price-commanding qualities or desiderata of the commodity are well-known. And long-standardized practices have represented best prior-art efforts to satisfy these commercially. Wherefore the novelties and advantages of my present invention (which now stand as established actualities by my existing commercial use thereof on a large scale) may best be understood by comparison with such prior art developments. For where prior procedure has been relatively slow, difficult and expensive, and is inherently productive of marked non-uniformity of the food-packs under normal commercial-production conditions, my improvements give greater speed and facility in the packing, very substantial reduction of packing-costs, and subsequent losses, and (more importantly, even) also a reliable assurance of product-uniformity and a marked attainment of bettered qualities in the edible pack.

Likewise it is an established fact (and indeed a quite self-evident one) that the container itself, the food-pack therein, the vacuum treatment necessary for meat-preservation, and the circumstances of normal handling of the packages in shipment, etc., are inter-related factors, rather than independent ones. They demand and bring about an inter-dependent relationship between container, packing method, and food-contents-quality.

Standard prior practice has provided a sturdy, thick-walled, half-headed can, closed by a soldered-on cap, as a necessary form of container; has relied upon manual skill and strength of the operator, working against the disadvantages and restrictions of such can-design, to pack the same reasonably-effectually with the irregularly-shaped, bulky, whole tongues (plus make-weight pieces and the usual binding-jelly material); has suffered, practically uncorrected, the initial variations of pack-density as well as the air-pocketing tendencies of the pack; and has relied upon the inherent strength of the sturdy container to withstand external air-pressure and shipment-injuries which tend to distort the can and to provoke air-leakage thereinto (and consequent meat-spoilage) after the usual vacuum-treatment has evacuated free spaces within the can. But, contrastingly, my improvements give to the market for the first time a beef-tongue package of decreased tare-weight, utilizing a thin-walled, initially-open-topped can, lock-seam headed and "rip-strip" openable; packed speedily and more effectually without demand for any peculiar skill or strength of the operator; notably uniformized in pack-density and being substantially voidless when sealed; reinforcing the lighter, more-advantageous container by the full solidity of its contained pack; yet all with decreased spoilage-liability and decreased liability of waste to the ultimate consumer. And coincidentally with the savings so effected and the facilities so attained, my de-canned pack is so uniformized in slicing quality, so made appetizingly palatable in taste and "feel", and so effectively assured a perfect and attractive "finish" that it commands a better price.

More specifically, the standard tongue-package is the six pond tin, its can containing six pounds net of tongue comprising, usually, from three to five whole tongues plus any necessary make-weight pieces. In the packing there is added a customary spoonful or so of hot, gelatinous material or "broth", to serve as a space-filler and (when cooled and therefore jelled) as a binder of the meat. The container itself is tare-weight, of course.

The standard heavy-walled container, too thick of wall to permit the incorporation of a "rip-strip" for convenient de-canning by the consumer, conventionally has a vertical lock-seam making quite a large interior rib which of course leaves a groove in the de-canned pack, and always it has a broad head-flange or annular head-wall which, like the bottom of the can, is an initial permanent part of its structure. Through the rather-small top hole left in the center of the head, the cooked and still-warm tongues—bulky, irregular and rather soft-textured at the root-end, and slenderly-tapering and denser toward the tip—have to be forced manually, with dexterous twists and forceful manipulation, by the operator—a large tongue about filling a complete layer of the can-capacity. The bulky root of one tongue is placed to overlie any unoccupied gap and the tip portion of the subjacent layer until the successive layers or spirals of tongues roughly fill the can-space, the meat being pushed and prodded manually under the head-flange and bulging somewhat through the top-orifice. Skillful, time-taking strong-fingered patience is always requisite to a commercially-acceptable insertion of the last whole tongue. And even with most expert labor, the twisting of tips out of appropriate layer or spiral (so that the distorted tip does not look well or slice well); the tearing of the tender skins of the tongues against the edges of the head-flange; the leaving of unfilled voids in the pack; and the lack of uniform density of different portions of the pack, are detriments that unescapably occur in a substantial percentage of packages in the quantity packing of tongues in the old way. They all depreciate the desirability of the final product.

In the prior art procedure the hand-filled can is closed by a centrally-vented cap placed over the filling orifice so that its margins overlap the inner margins of the head-wall. The cap is pressed down in a suitable mechanical press and the joint is soldered (usually manually) all around the circle, with the material disadvantages that the elastic resistance of the bulging meat sometimes defeats the effort to fully and accurately seat the cap for soldering and that the soldering heat is apt to, and in commercial practice often does, melt the tinning on the under-side of the head-flange (so that rust afterward sets in) and also scorches the meat-contents. Double soldering operation, increasing these dangers, often becomes necessary where cap-leaks appear on the customary pressure-tests of the solder-joint.

For final sealing (of the vent) and completion of the preserving-process, the capped can is placed in a vacuum chamber for exhaustion of the air-content to the usual extent, and the vent-hole is then sealed with a drop of solder while the can is in vacuo; after which the sealed can is submitted to any usual sterilization-processing that completes the canning procedure.

In commercial practice under my invention I employ a cylindrical can of customary size, but made of light-gauge metal, with "rip-strip" provision, and initially presenting a full-open end. This at once reduces the tare-weight and can-cost, facilitates ease of de-canning the contents without injury thereto, and does away with possible cutting of the tongues in inserting them into the can. Yet I am able, with such far-less sturdy container, to meet full strength-demands, as will further appear.

In the drawings, 10 indicates a suitable thin-walled can-body, the side-cylinder of which is lap-seamed vertically at 11 (Fig. 2) for smooth interior joint so as not to score the contained meat-pack; and while of course the bottom 12 is permanently united to the side wall as by a lock-seam 13, the top-opening 14 is left of full can diameter, the upper margin of the can being initially bordered by a narrow, out-turned locking-rim 15. By virtue of the thinness the cylinder wall may have, and in commercial practice I employ, a "rip-strip" 16 incorporated in it.

In loading such a full-open can the packer (after putting in the customary amount of jelly-material or "broth"), rapidly and effortlessly inserts the several tongue-layers together with make-weight filler pieces, there usually being at least two of these. Such pieces an experienced weigher-in readily cuts preliminarily to much shapes and sizes that the packer dresses the bottom and top layers with them, making such end-layers nearly all-meat for fine end-finish and full end-slice usability. The rather-springy contents will bulge quite high above the can-level, as shown in Fig. 1, although the visibility and accessibility of the work is conducive to snug, smooth packing of each tongue and avoidance of such detriments as voids, tip-twists, skin-ruptures, etc. As usual, a little more jelly is top-added. And in the drawings (Figs. 1 and 2) 17 represents a top-tongue of a four-tongue pack; 17$^a$ represents a filler piece of tongue of the top layer; and 18 indicates jelly material permeating the spaces between the solid meat.

From the packing-table each loaded can goes forward for pack-compression, which should best be done during the time that the contents are cooling. End-pressure is applied all over the full-open end, this being mechanical pressure and with provision giving vent for relief of fluid-surplus. In best practice the pressure is sufficient in force and duration to effectually fill any voids, expel pocketed air, densify the pack to a desirable approximation of uniform firmness of texture, give the rather-resilient meat an effectual "set" with its top-surface at substantially the intended head-level, and cause the extrusion through the vent-spaces of the lightest fluid-content of the initially over-filled can.

In carrying such steps into operation I preferably employ a score or so of presses, 20, as a battery serving one packing-table so that each can may be subjected to pressure for a considerable time before the press is needed to act on a subsequent can. Each of these presses is shown as comprising an open frame 21 having a can-positioning bottom ring 22 and a cross-bar receiving the threaded stem 23 which is manually operated and coacts at its lower end with the plunger-member 24. This member, as best shown in Figs. 4 and 5, preferably has on its underside a depending, thin crown-web 25 to fit easily within the can-circumference, an annular recess 26 being provided in the underside of the plunger to receive the can-flange 15 when the compression-surface 27 of the plunger has been depressed within the can to substantially the intended head-level that is subsequently to be occupied by the can-head. One or more small relief-orifices 28 are preferably provided in the plunger although slight leak space between the plunger and can may be depended on for pressure-relief. In operation the crown-web or ring serves as a gatherer for the meat, the top-heap of which is tucked inside of such web by the press-operator when he positions the can in the press, and it also coacts with the lip of the can as a guide-surface.

Procedurally the operator of such a battery of presses places the first-packed can at station A and turns down the screw to exert a gentle pressure. Then as he inserts the can at station B and starts the pressure-application at that station, he screws down press A a little tighter. And so on until, as illustrated in Fig. 3, when the can at station Z is just placed to receive compression of its contents, the one at station A is under fullest pressure and ready for removal from the press. Under such gradually-applied, intermittently-increased, and long-sustained mechanical pressure, exerted during the time that the contents of the cans are cooling, pressure-transfer within the pack of somewhat-elastic meat and gradually-solidifying jelly material is very effective in expelling air from the mass, filling voids, and tending to uniformize the density and apparent textural qualities of different portions of the tongue-meat, and when the operation is completed the pack is set quite definitely with its top-surface at substantially the intended can-head level. Also it is true that the high pressure within the can, under such conditions, tends to force out the lightest fluid-contents in relieving the can of any slight over-charge, the extruded material (oozing out of the relief orifice 28 and around the edge of the can, as illustrated at $o$ in Fig. 3) being usually watery fat-matter, sometimes accompanied by slight amounts of the jelly material. Such fat-elimination is very desirable commercially.

From the press-battery the can goes to the heading-machine (not shown) where a small amount of top-surfacing liquid jelly-material may be added, as suggested at 18$^a$ in Fig. 6. Then a full head 30 is applied and lock-seamed on, as illustrated in Fig. 7, the locking flange 31 being first forced tightly against flange 15 of the can as shown at the left of said figure and then interlocked with such flange, as shown at the right. Of course the head has the usual vent-orifice 32, underlain by the usual solder-shield 33. The head-application spreads the top-finishing jelly, any slight surplus oozing out of the head-vent, thus to insure an all-over, neat jellied finish to the head-end of the pack, not attainable under prior art practice. Exhaustion in vacuo and solder-sealing of the vent 32 are then effected in usual manner, as diagrammatically suggested in Fig. 8, wherein 35 represents a suitable vacuum chamber and 36 a suitable soldering device workable through a wall thereof. And any final sterilization may be according to known practice.

Fig. 9 suggests in general some of the superficial features of the resultant pack when de-tinned after long preservation, it being notably characteristic of my product that each compact block of tongues and translucent jelly presents its whole-tongues in neat, minimally-distorted layers or spirals (as represented by dotted-line continuations of the tongue-contours), for finest slicing-properties and with uniform excellence of "finish" that avoids waste of any portion by the consumer. All portions, including the top surface or end-slice, are appetizingly attractive in appearance and free from blemishes or discoloration in all unspoiled cans; and spoilage (primarily due to air in the can) is almost negligible as a source of loss or adjustment-claims under commercial use of my invention.

The stated "finish" is assured by the pressure-densified, voidless filling of the cans to such substantial fullness initially that (with the residual resiliency of the compressed meat aiding the result) there is no space for air-pocketing and consequent danger of tainting, and no vacuum-spaces to provoke can-denting due to partial collapse under atmospheric pressure or to provoke exudation of watery, fatty material of distasteful appearance, which (being light material) will exude from the meat into the vacuum pockets. Absence of such dents, as well as the smooth inner surface of the stated type of can (which I believe I have first made available for use in this tongue-canning industry) and avoidance of use of a can-opener-blade in decanning, practically eliminate all causes of surface-tearing of the pack and further enable the pack to be easily removed intact. The heatless heading of the can, as by the lock-seaming, not only reduces number of "leakers" and consequent spoilage, but saves the top-surface from that scorching and discoloration, common under prior-art practices, that changed the flavor of the affected parts and gave repellent appearance thereto. Indeed, as to flavor and its sensory concomitants, "feel" or consistency, which affect palatability of this food-product, it is bald commercial fact that, with their pressure-uniformized firmness of texture, their appetizing superiority of "finish", and their freedom from foreign flavor in any portion, even "second-grade" tongues packaged according to my invention are often expertly rated in flavor and valued in price equally with the normally-more-valuable "first-grade" tongues packed by hitherto-standard practices.

It will be understood that while I have explained a preferred employment of my invention in detail for purposes of full disclosure of its best application, variations in detail may readily be made without departure from the spirit of my invention within the scope of the appended claims.

I claim:

1. The method of canning tongues which consists in overloading with the jelly-material, whole tongues and filler-pieces, a can-body having a full-open end through which the load protrudes, submitting such load to mechanical end pressure, with provision for fluid-relief, so sustainedly and gradually applied as to condense, densify and temporarily set the contents with the top surface of the load at substantially the can-head level; securing a vented full-head to the can-body, and thereafter air-exhausting and vent-sealing the headed can.

2. The method of canning tongues which consists in inserting into a can-body having a full-open end the jelly material and warm tongues in bulk greater than the can-volume and with the meat protruding above the top end of the can-body; compressing the contents into a substantially-voidless, densified pack by mechanical end-pressure applied all over the exposed end, but affording a fluid-relief outlet, and so applied and sustained during the cooling of the meat as to temporarily set the elastic meat-contents with the top surface thereof at substantially the intended can-head level; heading the can with a vented head of full can-body-diameter that substantially contacts with the contents, and thereafter vacuum-treating and vent-sealing the fully-filled and headed can.

3. The method of canning tongues which consists in inserting in a can-body having a full-open end the jelly-material and warm tongues constituting a load of greater bulk than the can-volume with the meat-content protruding from the open top of the can-body; compressing the contents by mechanical end-pressure applied all over the exposed end, but affording a fluid-relief outlet, and so gradually and intermittently applied and so sustained during the cooling of the meat as to densify the pack to more-uniform meat-texture and effectually to set the elastic meat-contents with the top surface of the pack at substantially the intended can-head level; heading the can with a vented head of substantially full-can diameter substantially contacting with such pack; and thereafter air-exhausting and vent-sealing the headed can.

4. A method of the character described, consisting in canning tongues by snugly inserting into a can the load comprising jelly-material and a plurality of whole tongues with an excess of the initial tongue bulk projecting beyond the fill opening of the can; compressing the load by pressure applied substantially all over the end thereof exposed at said opening while affording relief outlet, the application of pressure being gradual and timed to allow pressure-transfer within the load to cause correspondingly gradual displacement of the load into any spaces and eliminate air pockets, and to permit substantial setting of the load, thereby producing a substantially voidless, densified pack; and suitably securing a can-head to the can.

5. A method of the character described, consisting in canning tongues by snugly inserting into a can the load comprising jelly-material and a plurality of whole tongues with an excess of the initial tongue bulk projecting beyond the fill opening of the can; gathering and conforming said excess within an area in line with the fill opening, compressing the load by pressure applied substantially all over the end thereof exposed at said opening while affording relief outlet, the application of pressure being gradual and timed to allow pressure-transfer within the load to cause correspondingly gradual displacement of the load into any spaces and eliminate air pockets, and to permit substantial setting of the load, thereby producing a substantially voidless, densified pack; and suitably securing a can-head to the can.

6. A tongue pack comprising a container of relatively thin metal to reduce weight and facilitate opening as by ripping, a lock-seamed head, and a filler of tongues and jelly-material compressed by high pressure transference and adjustment of the tongues into a solid block free from air pockets, and of substantially uniformly firm texture throughout capable of being sliced from end to end, the block constituting an internal reinforce for the thin wall of the container to impart adequate strength thereto against collapse, the density and conformity of the block to the capacity of the container insuring can-molded finish of the block over the entire surface thereof and avoiding retention of any deteriorating free liquids in the filler and consequent undue softening of the texture or loosening of the tongues in the pack.

In testimony whereof, I have subscribed my name.

GEORGE C. CASE.